(12) United States Patent
Nayar et al.

(10) Patent No.: US 11,697,734 B2
(45) Date of Patent: Jul. 11, 2023

(54) ELECTROSPUN COLLAGEN-GRAPHENE-POLYMER COMPOSITE NANOFIBERS FOR SUPERCAPACITORS

(71) Applicants: Council of Scientific and Industrial Research (CSIR), New Delhi (IN); John Keells Holdings PLC, Colombo (LK)

(72) Inventors: Suprabha Nayar, Jamshedpur (IN); Soumya Bhattacharya, Jamshedpur (IN); Divya Kumari, Jamshedpur (IN); Muditha Dharshana Senarath-Yapa, Colombo (LK); Chathuri Yatawara, Colombo (LK); Ganga Iddamalgoda, Colombo (LK)

(73) Assignees: COUNCIL OF SCIENTIFIC AND INDUSTRIAL RESEARCH (CSIR), New Delhi (IN); JOHN KEELLS HOLDINGS PLC, Colombo (LK)

( * ) Notice: Subject to any disclaimer, the term of this patent is extended or adjusted under 35 U.S.C. 154(b) by 1066 days.

(21) Appl. No.: 16/465,850

(22) PCT Filed: Dec. 7, 2017

(86) PCT No.: PCT/SG2017/050603
§ 371 (c)(1),
(2) Date: May 31, 2019

(87) PCT Pub. No.: WO2018/106189
PCT Pub. Date: Jun. 14, 2018

(65) Prior Publication Data
US 2019/0309167 A1  Oct. 10, 2019

(30) Foreign Application Priority Data
Dec. 9, 2016  (IN) .............................. 201611042094

(51) Int. Cl.
| | | |
|---|---|---|
| C08L 89/06 | (2006.01) | |
| C08L 29/04 | (2006.01) | |
| C08J 3/21 | (2006.01) | |
| H01G 11/36 | (2013.01) | |
| H01G 11/48 | (2013.01) | |
| D01F 1/09 | (2006.01) | |
| D01F 4/00 | (2006.01) | |
| D01D 5/00 | (2006.01) | |
| C08L 33/18 | (2006.01) | |
| C01B 32/19 | (2017.01) | |
| H01G 11/24 | (2013.01) | |
| H01G 11/32 | (2013.01) | |
| H01G 11/86 | (2013.01) | |
| C08L 27/16 | (2006.01) | |

(52) U.S. Cl.
CPC .............. *C08L 89/06* (2013.01); *C01B 32/19* (2017.08); *C08J 3/212* (2013.01); *C08L 27/16* (2013.01); *C08L 29/04* (2013.01); *C08L 33/18* (2013.01); *D01D 5/003* (2013.01); *D01F 1/09* (2013.01); *D01F 4/00* (2013.01); *H01G 11/24* (2013.01); *H01G 11/32* (2013.01); *H01G 11/36* (2013.01); *H01G 11/48* (2013.01); *H01G 11/86* (2013.01); *C01B 2204/04* (2013.01); *C08L 2203/12* (2013.01); *C08L 2203/20* (2013.01)

(58) Field of Classification Search
CPC ...... C08L 89/06; C08L 29/04; C08L 2203/20; C08J 3/212; H01G 11/36; H01G 11/48; D01D 5/003; D01F 1/09; D01F 4/00
See application file for complete search history.

(56) References Cited

FOREIGN PATENT DOCUMENTS

| CN | 105506780 | | 4/2016 |
|---|---|---|---|
| IN | 3566DE2013 | * | 6/2015 |

OTHER PUBLICATIONS

Shin et al., Journal of Nanotechnology, 2015 vol. 13, pp. 1-11 (Year: 2015).*
Almecija, et al., "Mechanical properties of individual electrospun polymer-nanotube composite nanofibers", *Carbon*, 47:2253 (2009).
Chu, et al., "Characterization of amorphous and nanocrystalline carbon films", *Mater. Chem. Phys.*, 96: 253-77 (2006).
Das, et al., "Raman spectroscopy of graphene on different substrates and influence of defects" *Bull. Mater. Sci.*, 31:579-84 (2007).
Geim, et al., "The Rise of Graphene", *Nat. Mater.*, 6:183-191 (2007).
Gong, et al., "Reversible Loss of Bernal Stacking during the Deformation of Few-Layer Graphene in Nanocomposites", *ACS Nano.*, 7:7287-94 (2013).
Hakimi, et al., "Synthesis and Applications in Biotechnology-A Review", *World Applied Programming*, 2:377-388 (2012).
Hummers, et. al., "Preparation of Graphitic Oxide", *J. Am. Chem. Soc.*, 80:1339 (1958).
Kim, et. al., "Supercapacitor performances of activated carbon fibers webs prepared by electrospinning of PMDA-PDA poly (amic acid) solutions", *Electrochim. Acta.*, 50:877 (2004).

(Continued)

*Primary Examiner* — Robert D Harlan
(74) *Attorney, Agent, or Firm* — Pabst Patent Group LLP (57) ABSTRACT

Disclosed herein is a composite material that is formed from a polymer, acetylated collagen and graphene, which can be used as a super-capacitor material. Also disclosed herein are methods of making said composite material and its intermediates, as well as a supercapacitor made using said material.

18 Claims, 8 Drawing Sheets

(56) References Cited

OTHER PUBLICATIONS

Laaksonen, et al., "Interfacial Engineering by Proteins: Exfoliation and Functionalization of Graphene by Hydrophobins", *Angew. Chem. Int. Ed.*, 49:4946-9 (2010).
Lotya, et al., "Liquid phase production of graphene by exfoliation of graphite in surfactant/water solutions", *J. Am. Chem. Soc.*, 131:3611-3620 (2009).
Novoselov, et al., "Electric Field Effect in Atomically Thin Carbon Films", *Science*, 306:666 (2004).
Park, et al., "Chemical methods for the production of graphenes", *Nature*, 4:217-24 (2009).
Quintana, et al., "Liquid-phase exfoliated graphene: functionalization, characterization, and applications", *Beilstein Journal of Nanotechnology*, 5:2328-2338 (2014).
Stankovich, et al., "Graphene-based composite materials", *Nature*, 442: 282-286 (2006).
Tran, et al., "A green approach for the reduction of graphene oxide nanosheets using non-aromatic amino acids", *Carbon*, 76:193-202 (2014).
Yang, et al., "Chemical analysis of graphene oxide films after heat and chemical treatments by X-ray photoelectron and Micro-Raman spectroscopy", *Carbon*, 47:145-52 (2009).
Zhang, et. al., "Layered Graphene Oxide Nanostructures with Sandwiched Conducting Polymers as Supercapacitor Electrodes", *Langmuir*, 26:17624 (2010).
Zhu, et al., "Carbon-based Supercapacitors Produced by Activation of Graphene", *Science*, 332:1537 (2011).
PCT Written Opinion for PCT/SG2017/050603 dated Jan. 25, 2018.
Webster, et al., "Colloidal graphite/graphene nanostructures using collagen showing enhanced thermal conductivity", Int. J. Nanomed., 9:1287-1298 (2014a).
Bhattacharya, et al., "Graphene Synthesis and Functionalization with Collagen Into a Aqueous Dispersion Showing High Photo-Luminescence", J. Nanofluids, 3: 8-16 (2014b).
English Translation of Chinese Office Action for related application No. 201780082648.X_dated Apr. 1, 2021.
English Translation of Chinese Office Action for related application No. 201780082648.X_dated Jan. 17, 2022 .
European Extended Search Report for related application No. 17878586.1 dated Jun. 2, 2020.
Indian First Examination Report for related Application No. 201611042094 dated Dec. 17, 2020.
International Preliminary Report on Patentability forPCT/SG2017/050603 dated Jun. 11, 2019.

\* cited by examiner

ELECTROSPUN COLLAGEN-GRAPHENE-POLYMER COMPOSITE NANOFIBERS FOR SUPERCAPACITORS

CROSS REFERENCE TO RELATED APPLICATIONS

This application is a National Phase application under 35 U.S.C. 371 of PCT/SG2017/050603, filed Dec. 7, 2017, which claims priority to and benefit of Indian Application No. 201611042094, filed in the Intellectual Property India Patent Office on Dec. 9, 2016, which are hereby incorporated herein by reference in their entirety.

FIELD OF INVENTION

The present invention relates to a graphene composite nanofiber and a method of making the same. More specifically, this relates to a collagen-graphene-polymer composite nanofiber, a method of producing the same (by exfoliation of graphite by collagen, electrospinning the resulting collagen-graphene complex with a polymer to form the collagen-graphene-polymer composite nanofiber), and uses of the nanofiber as a supercapacitor composite material.

The present invention also relates to the electrochemical capacitance of electrospun nanofibers of collagen-graphene-polymer composites. This invention particularly relates to the high electrical conductivity of graphene, even when in the form of a nanofiber composite. The major applications of this invention may be in the manufacturing of an electrochemical supercapacitor.

BACKGROUND

The listing or discussion of a prior-published document in this specification should not necessarily be taken as an acknowledgement that the document is part of the state of the art or is common general knowledge.

Since the advent of graphene in 2004, interest in graphene and graphene based materials has grown exponentially, driven mainly because of its incredible mechanical, electrical and thermal properties, which are a result of its high specific surface area, unique graphitized plane structure and extremely high charge mobility. As such, graphene is expected to become an important material for study, with many potential industrial applications and may even surpass carbon nanotubes in importance.

While it has proved difficult to readily manufacture graphene, it has proven more easy to manufacture composite materials in bulk that contain graphene, or rather a material made from a few layers of graphene (Stankovich et al. Nature, 2006, 442, 282-286). The challenge in processing graphene-reinforced composites is to achieve a strong interface and a uniform dispersion of graphene within the matrix material. This is because the true realization of graphene's remarkable properties is only possible if the graphene (or graphene-like material) is well dispersed and there is a strong interfacial adhesion between graphene and the other materials that comprise the composite. This can be difficult to achieve.

Reports suggest that the chemical functionalization of graphene can be achieved through covalent and non-covalent bonding of various organic functional groups such as isocyanate, polystyrene, polyglycidyl methacrylate, triphenylene, and dopamine. In covalent functionalization approaches, a functional group forms a covalent bond with a group present on the graphene surface. In contrast, the non-covalent functionalization method makes use of weaker interactions, such as van der Waals forces or π-π interactions between aromatic molecules on the graphene basal plane and the non-covalent functional groups.

While exfoliation can be brought about by any surfactant that can match the surface energy of the individual graphitic stacks, thus enabling the graphene layers to overcome the n-interaction and break away from parent stacks, very few research groups have attempted the exfoliation of graphite directly using proteins. Some attempts (e.g. Laaksonen, et al., Angew Chem Int Ed., 2010, 49(29), 4946-9) have been made using a genetically engineered protein, HFBI (a hydrophobin), but genetic engineering of proteins is tedious and cost intensive.

More recently, a simple green route for reduction of graphene oxide (GO) to graphene has been reported using non-aromatic and thiol-free amino acids (see Tran, et al. Carbon, 76 (2014) 193-202). Again these processes are via graphite-oxide and do not make use of a direct exfoliation from graphite to form graphene.

Therefore, there remains a need for new methods of preparing composite materials, which may also show new and surprising properties.

SUMMARY OF INVENTION

It has surprisingly been found that exfoliation of graphite by collagen results in a graphene-collagen composite material that can be transformed into a supercapacitor composite material by dispersing it in a polymeric matrix and electrospinning it. The resulting material has superior properties and is provided in a form that is readily conformable to many shapes and sizes, making it particularly suitable in consumer electronics.

It has been found that a composite material comprising a polymer, acetylated collagen and graphene can be used as a super-capacitor material. Thus, in a first aspect of the invention, there is provided a composite material comprising:
  graphene;
  acetylated collagen; and
  a polymeric material providing a polymeric matrix, wherein
  the graphene is attached to the acetylated collagen to form a graphene-collagen composite and the graphene-collagen composite is dispersed within the polymeric matrix.

In embodiments of the first aspect of the invention:
(a) the weight:weight ratio of graphene to collagen in the graphene-collagen composite material may be from 0.1:1 to 3:1 (e.g. from 0.5:1 to 2:1, such as from 0.5:1 to 1.5:1, e.g. 1:1));
(b) the polymeric material may be selected from one or more of the group consisting of polyvinyl alcohol, polyaniline, polystyrene, polypyrole, polymethylmethacrylate, polyvinylidine fluoride, polyacrylonitrile and polyacetylenes (e.g. the polymeric material is polyacrylonitrile or polyvinyl alcohol);
(c) the composite material may be in the form of a fibre or fibres (i.e. an electrospun fiber or fibers);
(d) the composite material may be in the form of a mat formed from the fibre or fibres (e.g. a mat formed from an electrospun fiber or fibres);
(e) the graphene may contain from 1 layer of graphene to 6 layers of graphene (e.g. from 1 layer of graphene to 3 layers of graphene);

(f) the dispersion of the graphene-collagen composite material within the polymeric matrix may be homogeneous;

(g) the graphene-collagen composite may have a zeta potential of from +30.0 to −30.0 mV (e.g. from −0.1 to −27.0 mV, such as −26.0 mV);

(h) the graphene-collagen composite may have a hydrodynamic diameter of from 100 nm to 500 nm (e.g. from 150 nm to 300 nm, such as from 200 nm to 260 nm, e.g. 256.2 nm);

(i) the graphene-collagen composite may have a polydispersity index of from 0.1 to 0.5 (e.g. from 0.3 to 0.45, such as from 0.35 to 0.4) when measured using dynamic light scattering;

(j) the composite material may have an ultimate tensile strength of from 1.0 MPa to 20 MPa (e.g. from 4.5 MPa to 15 MPa, such as from 4.9 MPa to 11 MPa);

(k) the weight:weight ratio of the polymeric material to the graphene in the collagen-graphene composite material may be from 100:1 to 5000:1 (e.g. from 150:1 to 2500:1, such as from 500:1 to 2250:1, or from 1000:1 to 1500:1);

(l) the weight average molecular weight of the polymer is from 16,000 to 120,000 Daltons.

It will be appreciated that any of the above embodiments may be combined together in any technically sensible manner that can be envisaged by a person skilled in the art.

In a second aspect of the invention, there is provided a use of a composite material as according to the first aspect of the invention, and any technically sensible combination of its embodiments, as a capacitive material.

In a third aspect of the invention, there is provided a capacitor comprising a composite material according to the first aspect of the invention and any technically sensible combination of its embodiments.

In a fourth aspect of the invention, there is provided a process to prepare a composite material according to the first aspect of the invention, and any technically sensible combination of its embodiments, said process comprising:

(a) mixing a graphene-collagen composite material dispersion in a first solvent with a polymer dissolved in a second solvent to form a composite solution; and (b) removing the solvent from the composite solution.

In embodiments of the fourth aspect of the invention, in step (b) the process of removing the solvent may comprise electrospinning the composite solution to form a fibre and/or a fibre mat. In yet further embodiments of the invention, the polymer may form from 5 wt/v % to 12 wt/v % of the composite solution (e.g. from 7 wt/v % to 10 wt/v %, such as 8 wt/v %, 8.5 wt/v % or 9 wt/v %).

In embodiments of the fourth aspect of the invention involving electrospinning:

(a) the electrospinning voltage may be from 10 to 20 kV; and/or (b) the distance between the ejector and collector of an electrospinning device used in the process may be from 5 to 20 cm; and/or (c) the feed rate of the electrospinning process may be from 0.01 to 0.05 mm/min.

DESCRIPTION

It has been found that exfoliating graphite by collagen results in a graphene-collagen composite material that can be transformed into a supercapacitor composite material by dispersing it within a polymeric matrix and electrospinning it. The resulting material has superior properties and is provided in a form that is readily conformable to many shapes and sizes, making it particularly suitable for use in wearable technology, or in consumer electronics.

As such, there is provided a composite material comprising:
  graphene;
  acetylated collagen; and
  a polymeric material providing a polymeric matrix, wherein
  the graphene is attached to the acetylated collagen to form a graphene-collagen composite and the graphene-collagen composite is dispersed within the polymeric matrix.

When used herein, "graphene" may refer to a single layer of graphene, but it is also intended to cover multiple layers of graphene sheets, such as up to 10 layers (e.g. 8 layers). In particular embodiments of the invention that may be mentioned herein, "graphene" may relate to a single layer of graphene up to 6 layers of graphene, such as up to 3 layers of graphene.

When used herein "acetylated collagen" refers to a collagen that has been treated with acetic acid and has been partly denatured, such that it no longer forms a perfect triple-helix structure, as is described in the experimental section below in more detail. For example, the hydrodynamic diameter of the acylated collagen may be from 400 to 600 nm, such as around 507.0 nm and/or have a polydispersity index of around 0.3 (3. g. 0.296)—both measured using dynamic light scattering.

When used herein, the term "attached" is intended to refer to an attractive force between an acylated collagen molecule and graphene. These forces may be covalent or ionic bonds, or, more particularly van der Waal's attractive forces that are sufficient to hold the two materials together as a composite material.

While any suitable weight:weight ratio of graphene to collagen may be used, specific ratios that may be mentioned herein include a ratio of from 0.1:1 to 3:1 in the graphene-collagen composite material. Other ratios that may be mentioned include ratios of from 0.5:1 to 2:1 and from 0.5:1 to 1.5:1. A particular weight:weight ratio of graphene to collagen that may be mentioned herein is a ratio of 1:1. Without wishing to be bound by theory, it is noted that a weight to weight ratio of graphene to collagen of 4:1 may not result in a material that has the desired capacitive properties because the content of graphene is too high, while a content of graphene below 0.1:1 may be too low.

As will be appreciated, any suitable polymeric material may be used to form the polymeric matrix in which the graphene-collagen composite material is dispersed. Suitable polymeric materials include, but are not limited to, polyvinyl alcohol, polyaniline, polystyrene, polypyrole, polymethylmethacrylate, polyvinylidine fluoride, polyacrylonitrile and polyacetylenes. Particular polymeric materials that may be mentioned herein are polyacrlonitrile and polyvinyl alcohol.

The composite material may be provided in any suitable form, such as a film, a fibre, an extruded pellet etcetera. In particular embodiments that may be mentioned herein, the composite material may be provided in the form of a fibre or fibres (e.g. a plurality of fibres). Such fibres may, for example, be prepared by blending the ingredients together in the presence of a solvent and electrospinning fibre(s) from the resulting mixture. It will be appreciated that the composite material may also comprise a secondary structure in addition to that imparted by the initial processing step of manufacture. For example, the composite material may be provided in the form of a mat from fibre or fibers, such as a mat formed from an electrospun fiber or electrospun fibers.

It will be appreciated that the dispersion of the graphene-collagen composite material may be a heterogeneous dispersion or, more particularly, a homogeneous dispersion, that is the graphene-collagen composite material is dispersed substantially uniformly throughout the polymeric material.

The composite material may have an ultimate tensile strength of from 1.0 MPa to 20 MPa (e.g. from 4.5 MPa to 15 MPa, such as from 4.9 MPa to 11 MPa).

The graphene-collagen composite used in the composite material mentioned hereinbefore may have one or more of the following properties:
  (a) a zeta potential of from +30.0 to −30.0 mV (e.g. from −0.1 to −27.0 mV, such as −26.0 mV);
  (b) a hydrodynamic diameter of from 100 nm to 500 nm (e.g. from 150 nm to 300 nm, such as from 200 nm to 260 nm, e.g. 256.2 nm);
  (c) a polydispersity index of from 0.1 to 0.5 (e.g. from 0.3 to 0.45, such as from 0.35 to 0.4) when measured using dynamic light scattering.

It will be appreciated that any technically sensible amount of graphene with respect to the amount of polymeric material is intended to be covered by the current application. In other words, the amount of graphene in the composite material is sufficient to provide a supercapacitive effect. Particular weight:weight ratios of the polymeric material to the graphene in the collagen-graphene composite material that may be mentioned herein include from 100:1 to 5000:1, from 150:1 to 2500:1, from 500:1 to 2250:1, and from 1000:1 to 1500:1.

As noted hereinbefore, the material that is produced may have good capacitive properties. As such, the current invention also relates to the use of the composite material described hereinbefore, as a capacitive material. In particular embodiments of the invention that are mentioned herein the use may be as a supercapacitive material.

Given the capacitive properties of the composite material described herein, said material may be used to form a capacitor. As such, there is also provided a capacitor comprising a composite material as described hereinbefore.

One way to form a composite material as described hereinbefore, involves a process comprising:
  (a) mixing a graphene-collagen composite material dispersion in a first solvent with a polymer dissolved in a second solvent to form a composite solution; and
  (b) removing the solvent from the composite solution.

Said process may be used to make a film of material or a fiber. In particular embodiments of the invention, the process of removing the solvent may comprise electrospinning the composite solution to form a fibre and/or a fibre mat. In yet further embodiments of the invention, the polymer may form from 5 wt/v % to 10 wt/v % of the composite solution (e.g. 7 wt/v %, 8 wt/v %, 8.5 wt/v % or 9 wt/v %).

Any suitable solvent may be used in forming the composite material, provided that can dissolve the polymer that is used and it is also compatible with the graphene-collagen composite material. Suitable solvents that may be mentioned herein include water, an alcohol (e.g. methanol, ethanol, propanol, isopropanol, butanol, isobutanol) tetrahydrofuran, acetone, ethyl acetate, diethyl ether, toluene, hexane and the like.

The process of the invention involves electrospinning nanofibers from a polymer-collagen-graphene colloid. The two broad parameters studied were the system parameters and the process parameters. Each of these parameters affect the fibre morphology obtained, and by proper optimization of these parameters, nanofibers of desired morphology and diameters can be obtained.

The system parameters include concentration, viscosity, molecular weight of the polymer, and the surface charge density. The process parameters studied were voltage, feed rate, and ejector to collector distance.

The concentration of polymer solution plays an important role in fiber formation during the electrospinning process. At low concentrations (i.e. less than 5 wt %), polymeric microparticles will be formed, and electrospraying is observed instead of electrospinning, owing to the low viscosity and high surface tension of the solution. At higher concentrations (i.e. greater than 12 wt %), the charged jet shows a greater resistance to the stretching due to its high viscosity. The more viscous solutions are difficult to be pumped through the spinneret, or the tip of the spinneret may dry up too quickly as a result of insufficient amount of solvent. Fiber beads are observed due to the effect of surface tension, which acts to reduce the surface area of the jet.

Molecular weight of the polymer is yet another important parameter that affects the morphology of the electrospun fiber. It was observed that a low weight average molecular weight for the polymer (i.e. less than 16,000 Daltons) tends to form beads rather than fibers and a high weight average molecular weight for the polymer (i.e. greater than 120,000 Daltons) gives fibers with larger average diameters. Molecular weight of the polymer reflects the number of entanglements of polymer chains in a solution, thus solution viscosity.

For electrospinning, the solution needs to be sufficiently conductive to enable the surface charges to overcome the surface tension of the droplet and initiate jet flow. Generally, the voltage and the stretching of the electrospinning jet are directly proportional to each other, due to the increase in columbic force exerted by the charges. A reduction in fiber diameter was observed while increasing the voltage, due to increased stretching, but going beyond a critical voltage caused more solution to be ejected from the nozzle, which lead to formation of thicker fibers. As such, a voltage rage of from 10 to 20 kV was required in order to enable fiber formation.

Varying the ejector to collector distance changes the flight distance as well as the electric field strength for a given voltage. When this distance is reduced the time required for the solvent to evaporate decreases and the fibers did not dry properly, forming either an interconnected fiber mesh or a polymer film, depending on the wetness of fibers. Conversely when the distance is increased, the fiber diameter decreases, as by the increasing the flight path the stretching of the electrospinning jet is increased. As such, the distance between the ejector to collector was from 5 to 20 cm.

The feed rate balanced the solution extraction rate which was determined by the magnitude of the voltage. Increasing the feed rate resulted in increased fiber diameters and bead size because greater volume of solution was drawn from the ejector tip. At the same voltage, when the feed rate is decreased, more charge accumulated on the droplet at the apex of the ejector, leading to thinner fibers due to increase in stretching. As such, the feed rate was maintained at a rate of from 0.01-0.05 mm/min. Below 0.01 mm/min thin fibers were obtained, while over 0.05 mm/min, thick fibers were obtained. Such fibers were deemed unsuitable.

Cyclic Voltammetry (CV) is a type of potentio-dynamic electrochemical measurement. In a CV experiment the working electrode potential is ramped linearly versus time. Unlike in linear sweep voltammetry, after the set potential is reached in a CV experiment, the working electrode's potential is ramped in the opposite direction to return to the initial potential. These cycles of ramps in potential may be repeated as many times as desired.

The current at the working electrode is plotted versus the applied voltage (i.e., the working electrode's potential) to give the cyclic voltammogram trace. The electrode potential in the cell ramps linearly versus time in cyclical phases. The rate of voltage change over time during each of these phases is known as the experiment's scan rate (V/s). The potential is applied between the working electrode and the reference electrode while the current is measured between the working electrode and the counter electrode. These data are plotted as current (I) vs. applied potential (V, often referred to as 'potential').

CV may be run with two-electrode or three-electrode cell connections. Three-electrode connections are common in fundamental research, to allow one electrode to be studied in isolation-without complications from the electrochemistry of the other electrodes.

The three electrodes are:

Working Electrode, the electrode being tested.

Reference Electrode, an electrode with a constant electrochemical potential.

Counter Electrode, generally an inert electrode present in the cell to complete the circuit.

A voltage sweep applied to an ideal capacitor creates a current given by $$I = \frac{dQ}{dt} = C\frac{dV}{dt}$$

Where, I is current in amperes, Q is the charge in coulomb and $$\frac{dV}{dt}$$

is the scan rate of the voltage ramp.

The steps involved in the present invention are:

The process of collagen-graphene composite synthesis is as discussed below.

The stock of polymer was prepared with distilled water in a temperature range 80-120° C.

The collagen-graphene composite colloid was mixed with polymer in different volumes to make a final concentration of 5% to 9%.

Collagen-graphene-polymer mixture was filled in the syringe pump for electrospinning in Nanofiber Electrospinning Unit (KATO Tech. Co. Ltd. Japan)

Target speed was optimized (1-5 m/min)

Syringe pump speed was optimized (0.01-0.05 mm/min)

Traverse speed was optimized (1-5 cm/min)

Voltage was optimized (15-25 kV)

CV was conducted using a three electrode system.

The fibers were clamped between folded platinum foil which served as the working electrode and dipped in various aqueous electrolytes like sodium chloride (NaCl), sodium sulphite ($Na_2SO_3$), potassium hydroxide (KOH) etc.

Scan rate was optimized (10-100 mV/sec).

The voltage window was varied between 0.5-5 V.

Area of the active material was varied from 4 $cm^2$ to 16 $cm^2$.

The specific capacitance was calculated from the equation $$C_s = \frac{1}{m\Delta V}\left(\frac{\int_{V_a}^{V_c} I(V)dV}{v}\right) = \frac{\text{Charge stored}}{\text{mass of active material} \times \text{voltage window}}$$

Where m is the mass of the active material in the electrodes (g), v is the potential scan rate (mV/s), $V_c$ is the cathodic potential (V), $V_a$ is the anodic potential (V), I(V) is the response current density (A), V is the potential (V) and E is Energy density in (Wh/g) Further aspects and embodiments of the invention will be described hereinbelow with reference to the examples.

EXAMPLES

The following examples are given by way of illustration of the present invention and therefore should not be construed to limit the scope of the present invention.

Materials

Poly(vinylidone fluoride) and collagen (Achilles tendon) were obtained from Sigma-Aldrich. High purity natural Graphite Carbon (−200 mesh, 99.9999% pure) and carbon black were obtained from Alfa Aesar. Glacial Acetic Acid (99.5 v/v %) was obtained from Merck. Poly(vinyl alcohol), 96% hydrolyzed (Molecular Weight 95,000 g/mol), was obtained from Acros Organics and N-Methyl Pyrrolidinone was obtained from Aldrich.

Equipment

1. Nanofiber Electrospinning Unit, KATO Tech. Co. Ltd.
2. Transmission Electron Microscope (TEM), Philips, CM200
3. Dynamic Light Scattering (DLS), NANO 100 Zetasizer
4. Atomic Force Microscopy (AFM), Bruker VEECO
5. Surface Enhanced Raman spectroscopy (SERS), Nicolet, AlmegaXR Dispersive Raman Spectrometer
6. X-ray Photoelectron Spectroscopy (XPS), Specs Spectrometer with MgKα source
7. Spectrofluorometer, Hitachi F-4500
8. Scanning Electron Microscope, FEI Nova NanoSEM 430 UHR
9. Mechanical testing machine, Instron Electroplus E1000 K6310
10. Impedence Analyzer, Agilent
11. GAMRY Reference 600 potentiostat/galvanostat/ZRA General Preparations General Preparation 1

Synthesis of Collagen-Graphene (GC Composite)

Natural graphite was added to collagen dispersed in 10 v/v % acetic acid (glacial acetic acid was diluted with deionised water to 10 v/v %) at a concentration of 0.1 g of graphite per 100 mL of 10 v/v % acetic acid and stirred at 250 RPM overnight. A greyish-black colloidal dispersion was obtained which was centrifuged at 1000 RPM for 10 minutes. The precipitate pellet was discarded and the supernatant, comprising the stable colloidal collagen-graphene composite, was collected.

General Preparation 2

Poly(vinyl alcohol) (25 g), 96% hydrolyzed (Molecular Weight 95,000 g/mol) was added to 250 mL distilled water to provide a 10 wt/v % stock solution. PVA is sparingly soluble in water and hence it was heated to 80° C. so as to disrupt the strong intra- and inter-chain bonds to enable dispersion in water.

The 10 wt/v % PVA stock solution was mixed with an amount of a carbonaceous material to form a carbon-PVA composite. A 20 mL syringe with an internal diameter of 2 cm was used and the carbon-PVA composite was loaded therein. The loaded syringe was fixed onto a Nanofibers Electrospinning Unit (KATO Tech. Co. Ltd.) and the unit was allowed to run for 8 hrs. The operating parameters were set as follows: syringe pump speed at 0.01 mm/min; applied voltage at 20 kV; and traverse speed was 5 cm/min. An aluminium foil covered the collector drum that collected the carbon-PVA composite nanofiber mat that formed during electrospinning. At the end of the process, the nanofibrous mat formed at the target drum was carefully removed from the aluminium foil for use in further tests.

Example 1

Synthesis of Graphene-Collagen Composites

Following General Procedure 1, a graphene-collagen composite dispersion with a wt:wt ratio of 1:1 graphite:collagen (G:C) was formed.

The graphene-collagen composite dispersion was then subjected to General Procedure 2 to form an electrospun mat of Graphene:collagen-PVA composite material. Several electrospun mats were obtained by varying the amount of graphene-collagen composite dispersion added to the 10 wt/v % PVA stock solution as described in Table 1. Each sample was prepared using a 30 mL solution.

TABLE 1

| Sample No. | PVA wt/v % | Volume of 10 wt/v % PVA Stock Solution used (mL) | Volume of C:G dispersion used |
|---|---|---|---|
| 1 | 9 wt/v % | 27 mL | 3 mL |
| 2 | 8.5 wt/v % | 25.5 mL | 4.5 mL |
| 3 | 8 wt/v % | 24 mL | 6 mL |
| 4 | 7 wt/v % | 21 mL | 9 mL |

Synthesis of Control Materials

Using the electrospinning conditions mentioned in General Preparation 2, electrospun mats were also made using the 10 wt % PVA stock solution alone. In addition, following General Procedure 2, 0.006 g graphite powder was added as the carbonaceous material to the 10 wt/v % PVA stock solution to form an 8 w/v % Graphite-PVA composite material that was used to form an electrospun mat.

When used herein, the wt/v % listed refers to the concentration of the PVA unless otherwise stated.

Characterization Techniques

Characterization Techniques for Collagen-Graphene Composite

Transmission electron microscopy (TEM) was done using an analytical Philips CM200 microscope at 200 kV. All dispersions were dried on carbon coated copper grids (~300 mesh scale) and then imaged. The hydrodynamic diameter (DH), polydispersity index (PDI) and zeta potential were measured by dynamic light scattering (DLS) using a NANO 100 zetasizer. Atomic force microscopy (AFM) was done using a Bruker VEECO microscope in the non-contact mode at ambient conditions using a pyrex glass cantilever with silicon tip and a scanning speed of 0.5 Hz. A drop of the dispersion was dried on a glass substrate and the surface imaged, with post processing and image analysis done using NanoScope Analysis software. Surface enhanced Raman spectroscopy (SERS) spectra were recorded using a Nicolet Almega$^{XR}$ dispersive Raman spectrometer (using a Nd:YAG laser source, λ=532 nm) by drying a drop of the sample on a polished copper substrate for surface enhanced signals. X-ray photoelectron spectroscopy (XPS) spectra were recorded using a Specs spectrometer with a MgKα source (1253.6 eV), where a few drops of the dispersion was dried on a glass substrate and then inserted into a vacuum chamber having a pressure of around 10-9 Torr. The resulting spectra were de-convoluted using CASA XPS software, post Shirley background subtraction. All peaks were calibrated with respect to the standard C1s binding energy peak of pure graphite (GR) at 284.5 eV. Photoluminescence (PL) and fluorescence (FL) were measured using a Hitachi F-4500 spectrophotometer at an excitation wavelength of 280 nm and emission scan range from 290-900 nm for PL and 290-450 nm for FL.

Physical Characterization Techniques for Nanofibers

Scanning Electron Microscopy (SEM) was done using a FEI Nova NanoSEM 430 UHR. The nanofiber samples were coated with a silver layer a few nanometers thick using a sputtering machine to minimize charging in the Scanning Electron Microscope, and the images were taken for all the 4 different concentrations of PVA/Graphene nanofibers and its control PVA solution, including PVA/Graphite nanofibers. The voltage was maintained at 15 kV, except for 8 wt/v % PVA/Graphene (which was 10 kV) and the working distance at 14 mm. For mechanical testing ASTM D638 was followed, and the nanofiber mats were cut into ASTM (American Society for Testing and Materials) standard tensile shapes (Gauge length=25 mm, width=5 mm, Total length=60 mm). The thickness of the samples was measured using a digital verniercalliper with a least count of 0.001 mm. Two samples from each mat were cut to the standard tensile shape and mechanical testing was done using a Mechanical testing machine (InstronElectroplus E1000 K6310, U.K.) with a dynamic capacity of 1000N. During the test, the ramp rate was maintained at 0.025 mm/sec to obtain a strain rate of 10-3 $sec^{-1}$, and a data acquisition rate of 5 Hz. The original Load-Elongation data obtained was converted into Engineering Stress—Strain values. A graph was plotted between Stress and Strain and the Ultimate Tensile Strength was calculated. This testing was repeated for both PVA/Graphene nanofibers and control PVA nanofibers and their Tensile properties were compared.

Characterization Results

Collagen-Graphene Composite (1:1 Ratio)

Transmission Electron Microscopy (TEM)

TEM micrographs (FIG. 1) reveal that the exfoliation and functionalization into colloidal graphene platelets occurs simultaneously. At first, the acylated collagen attacks parent graphitic stacks, because of the shear forces, collagen molecules slowly penetrate the layers and rip apart graphene platelets a few layers thick (3-5 layer thickness). The indexed selected area diffraction (SAD) pattern (FIG. 1d taken from 1a) confirms hexagonal symmetry. It was observed that the intensity of the diffraction spots from $\{11\bar{2}0\}$ family of planes corresponding to the 2nd order Laue zone was greater than the first order reflections from $\{10\bar{1}0\}$ planes, the zone axis was along the [0001] direction. Such an observation has been previously reported for FLGs. Under the diffraction conditions used, the angular difference between the radius vector R1 $\{10\bar{1}0\}$ and R2 $\{01\bar{1}0\}$ was 58°, whereas between R2 $\{01\bar{1}0\}$ and R3 $\{1\bar{1}00\}$, it was 620. Deviation from perfect hexagonal symmetry ($\theta=60°$) indicates lattice distortion due to exfoliation.

Dynamic Light Scattering

Table 1 shows the values for collagen dispersions with and without graphene. The process to form composite nanosheets seems to be both charge and steric stabilized. The hydrodynamic diameter of acylated collagen alone was much bigger than that of unacylated collagen, which shows that it has a much more open structure due to partial degradation of the protein and unwinding of the triple helical strands. In other words, the acylated collagen is more hydrophilic than that of ordinary collagen. However, when graphene is present (i.e. in the acylated collage:graphene composite), the hydrodynamic diameter of the collagen shrinks, which was observed for all composite samples. That is, the addition of the graphene results in a more hydrophobic material than the acylated collagen alone.

Without wishing to be bound by theory, as the hydrophilic-hydrophobic interaction dominates, the hydrodynamic diameter of the collagen contracts in proportion to the hydrophobic hydration capability of the composite. Hydrophobic hydration behaves oppositely to polar hydration and therefore there is a reduction in density and an increase in the heat capacity of the surrounding water molecules. As a consequence of hydrophobic hydration, there are also multiple van der Waals interactions between water molecules and the hydrophobic material. In addition, due to the high surface area and surface activity of the nanomaterial, the graphene platelets (which are from 2-6 layers thick and around 500 nm in size) tend to aggregate if not stabilized by the presence of a surfactant. As a test for stability, these fluids were subjected to centrifugation, collagen at 8000 rpm tends to settle and therefore, there is a difference in the few layer graphene content and hence the coloration of the fluid, pre and post centrifugation. After functionalization, the graphene surface acquires characteristics of the functionalizing agent and the surface potential changes in accordance with the pH of the dispersion (pH=7.3); hence the difference in the zeta potential (Table 2). It is reported that ionic surfactants stabilize graphene sheets with a concentration that increases with the square of the Zeta Potential.

TABLE 2

Hydrodynamic diameter (DH), zeta potential ($\xi$) and polydispersity index (PdI) of graphene dispersions

| Sample | Zeta Potential ($\xi$, mV) | Hydrodynamic Diameter ($D_H$, nm) | Polydispersity Index (PdI) |
|---|---|---|---|
| Acylated Collagen | +36.0 | 507.0 | 0.296 |
| Graphene:Composite (1:1 wt ratio) | −26.0 | 256.2 | 0.400 |

As the polydispersity index was calculated using dynamic light scattering, a monodisperse material would have a Pdl of 0.0, a narrow range of dispersity would have a Pdl of from 0.0 to 0.1, a moderate range of dispersity would be from 0.1 to 0.4 and a broad dispersity would be greater than 0.4.

Atomic Force Microscopy

Atomic force microscopy of the collagen protein (control) and the edge thickness and lateral dimensions of the graphene sheets in the composite were inferred from 1×1 μm area images (the initial scanning was done in 10×10 μm). The helical nature of the collagen was visible in the phase microscopy images of collagen (not shown), however, no stiffness change was noted during AFM scanning. The micrograph had uniform contrast; however, after magnification the overlapping gap regions (60-70 nm) of the collagen triple helix were visible.

Figure 2:
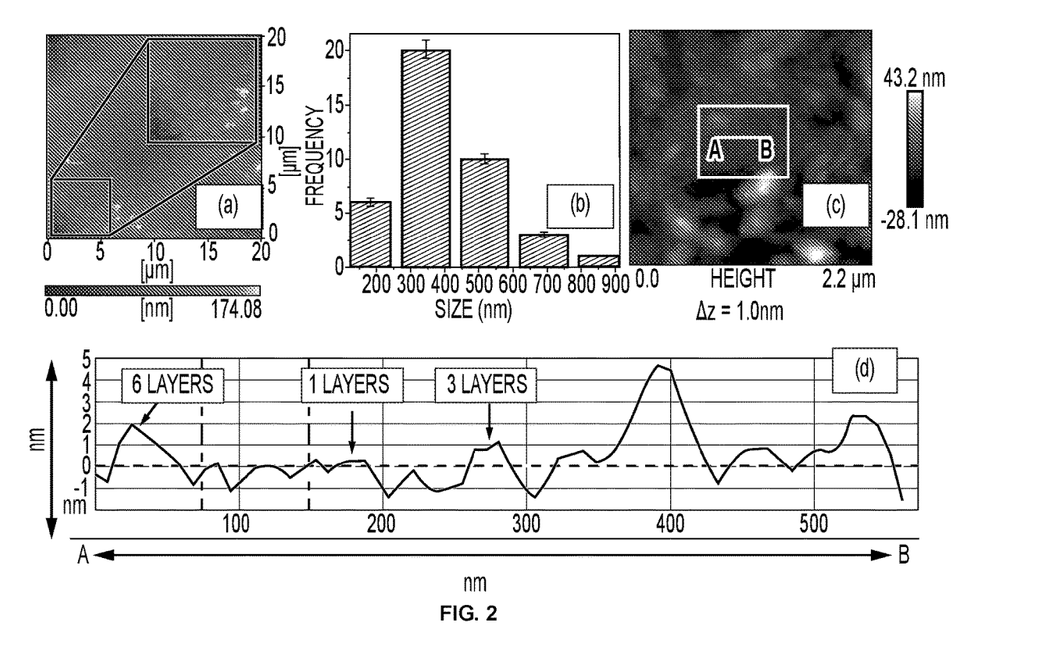
FIG. 2 (a) AFM images showing the formation of collagen modified graphene nanoplatelets taken in the non-contact mode; (b) The lateral dimensions of the platelets were on an average within 200-500 nm graphene in acylated collagen; (c) ΔZ signifies the difference in the height profile; (d) sectional analysis of the height in the sample in (c) showing the formation of single layer sheets along with multilayers; the thickness is equal to 1.0 nm corresponding to 3 layers.

In contrast to collagen, due to the presence of graphene in the composite material, a distinct change in the stiffness was observed during AFM scanning which appeared as valleys indicating different phase regions. Almost transparent sheets were visible in regions where the helical nature of the collagen in the composite material was disturbed, which indicated the presence of graphene. The lateral dimensions of the platelets were on average within 200-500 nm (shown in FIG. 2); the thickness is equal to 1.3 nm corresponding to 4 layers. The size distribution showed the formation of polydisperse nanoplatelets, the maximum frequency was in the 300-350 nm range. When conducting these AFM experiments, very mild sonication (150 Watts, 40 KHz for 10 mins at regular intervals of 5 mins) in a bath was done.

Raman Spectroscopy

Figure 1:
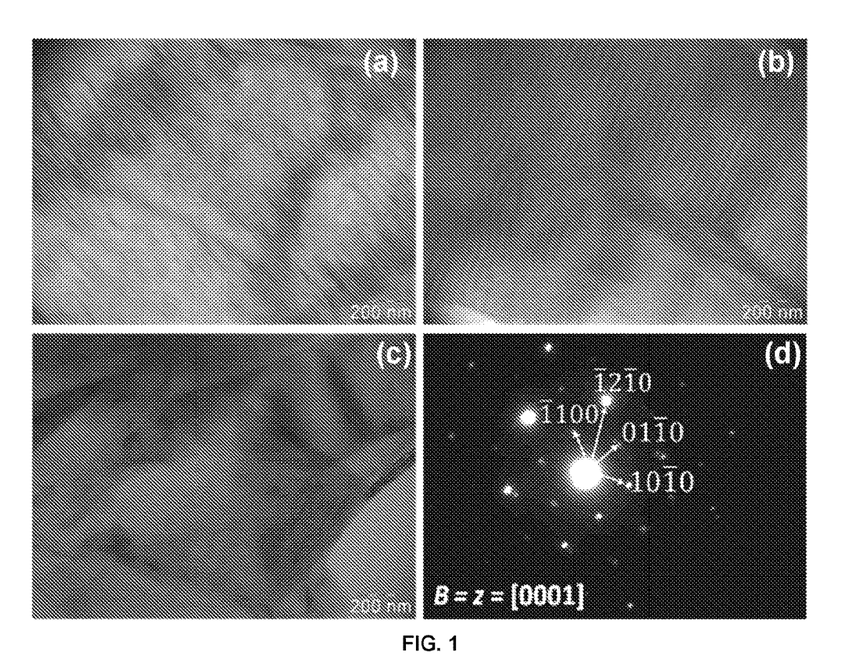
FIG. 1 TEM micrographs with indexed SAD patterns of collagen-graphene composites; the zone axis is along [z]= [0001].
Figure 3A:
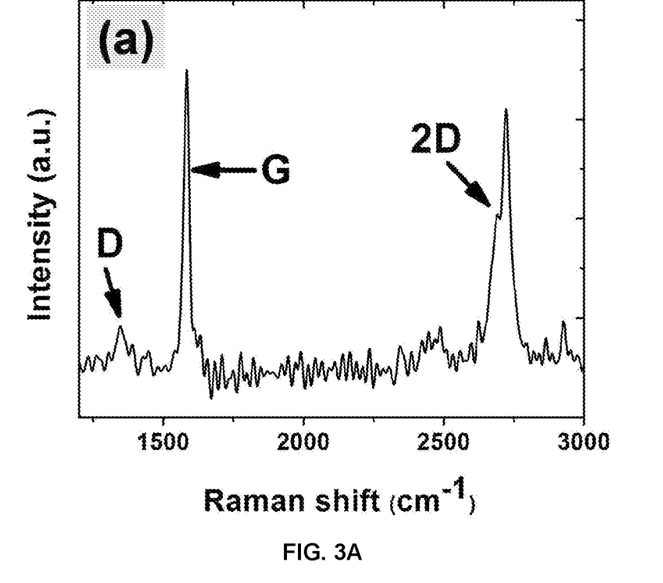
FIG. 3 (a, b) Raman spectra showing the full spectra; G, D and 2D bands are present along with D overtones, (c) the stain induced splitting of the 2D band was red shifted which indicated exfoliation and composite formation.
Figure 3B:
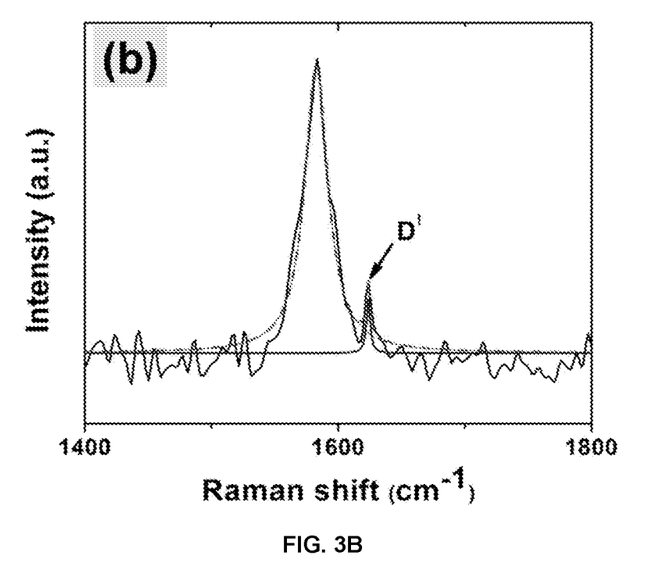
Figure 3C:
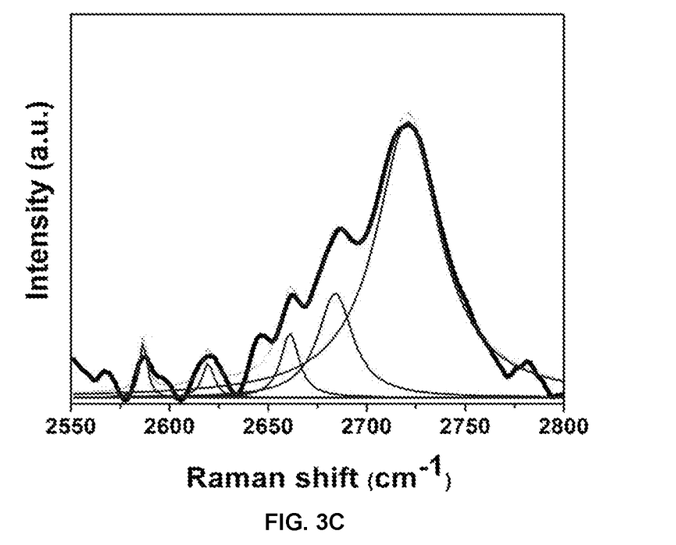

FIG. 3 depicts Raman spectra that were measured using the 532 nm line of Argon laser as excitation source at room temperature. A change of the polarization potential/deformation of the electron cloud is necessary for a molecule to exhibit Raman effect, an effective tool to confirm the difference in the interaction of collagen and graphite. The three most intense Raman features were at ~1580 cm$^{-1}$ (G band), ~1350 cm$^{-1}$ (D-band) and ~2700 cm$^{-1}$ (2D band); in addition to these, a band at ~1620 cm$^{-1}$ (D' band) may or may not be present. The G band is an in-plane vibrational mode involving the sp$^2$ hybridized carbon atoms in carbon nanostructures; the D and D' bands are defect-induced features. The intensity of the D peak is attributed to the disorder but not related to the number of layers and normally the peak intensity ratio ID/IG is measured to ascertain the degree of disorder. The ID/IG and I2D/IG ratio was 0.26 and 0.88 which signified graphene having a thickness of 5 layers. The presence of a D band signifies defects and it has been reported that with increasing sp$^3$ content the D signal weakens. In addition to the D band, the D' band was detected signifying crystallographic defects, like dislocations/stacking faults, which correlate well with the TEM and AFM data. The 2D band however, is not defect-induced and represents the stacking order. Interestingly, the highly broadened 2D band was fitted with Lorentzian line shape function using Origin 8.0 software and deconvoluted into 4 components (2720, 2684, 2661 and 2619 cm$^{-1}$). The change in Raman band width (estimated from FWHM in eV) and shape may be due to the loss of Bernal stacking of the graphite layers as a result of interaction of collagen molecules. This loss in stacking results in the formation of arrays of partial dislocations and stacking faults on the basal planes; twisting and rotation of the layers is clearly visible from the Moiré fringes in the TEM micrographs (FIG. 1). It is to be noted that the red shift of the 2D band is dependent on the stress exerted on the layers, which may be caused by the presence of acylated collagen that reduces the surface energy between graphite and water, allowing the water molecules to adhere to and bond with the carbon atoms, thereby the water molecules exert pressure as they interact with the graphite flakes, resulting in lattice distortion and exfoliation of the graphite graphene sheets (of a few layers thick).

X-Ray Photoelectron Spectroscopy

Figure 4A:
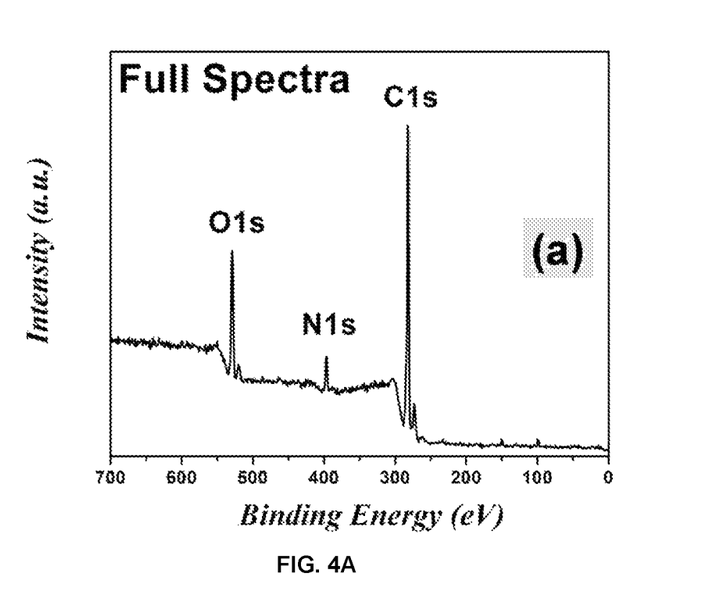
FIG. 4 (a) full XPS spectrum of Collagen-Graphene composite; (b) portion of XPS spectrum of Graphite; and (c) portion of XPS spectrum of Collagen-Graphene composite. The increase in peak width and shift towards higher binding energy signify interaction of collagen with graphite FIG. 5 SEM images at 20000×. (a) 7 wt/v % PVA/graphene:collagen (176 nm), (b) 8 wt/v % PVA/Graphite (139 nm), (c) 8 wt/v % PVA/graphene:collagen (334 nm), (d) 8.5 wt/v % PVA/graphene:collagen and (e) 9 wt/v % PVA/graphene:collagen (238 nm)
Figure 4B:
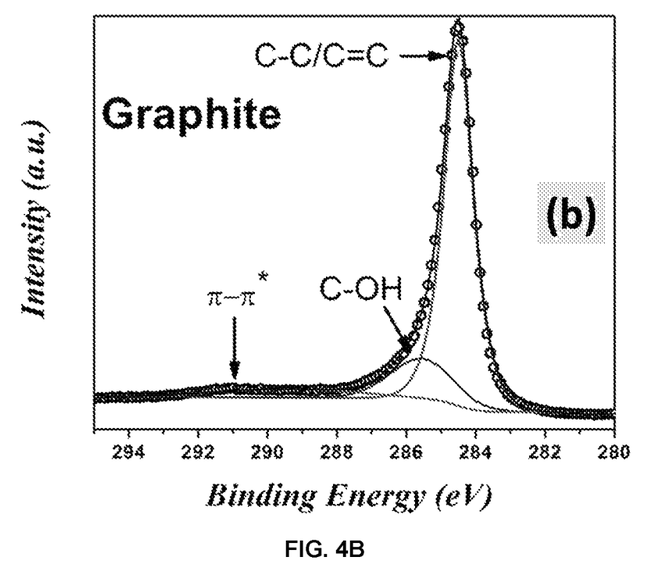
Figure 4C:
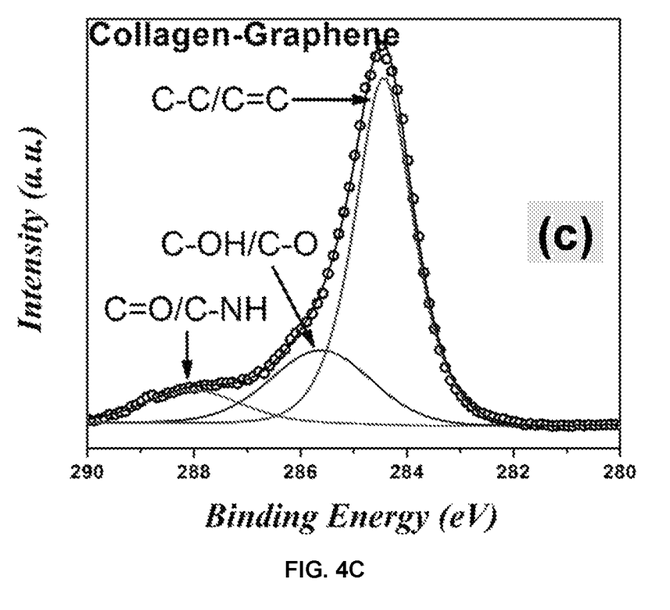

XPS showed interaction of the collagen molecules with the sp$^2$ hybridized carbon atoms of graphite, extremely sensitive to the chemical environment that causes a shift in the binding energy. The shift depends on the nature of the chemical ligands that bind with the carbon atom; electron donating groups (e.g. NH$_2$, OH$^-$, O$^{2-}$) increase the binding energy and electron acceptor groups decrease it. The full spectra of the samples was taken in the range 0-700 eV; they consist of C1s (~284.5 eV), O1s (~534 eV) and N1s (~401 eV) core level peaks; the N1s was for protein signature from collagen, which was not present in graphite. To calculate the percentage of functional groups, peak shift and broadening, the C1s peaks were de convoluted using CASA XPS software considering Voigt functions; the Gaussian and Lorentzian line shapes were adjusted in each case with 30% Gaussian and 80% Lorentzian character for graphite; the remaining were fitted with 30% Gaussian and 70 Lorentzian character; all fitting were done post Shirley background subtraction. The C1s spectrum of graphite consisting mainly of sp$^2$ carbon had a broad asymmetric tail towards the higher binding energy as shown in FIG. 4. It showed a highly intense and sharp peak at 284.5 eV corresponding to sp$^2$ hybridized C—C/C=C bonds in the hexagonal lattice along with a minor component at 285.56 eV corresponding to sp$^3$ C—OH bonds due to surface adsorption of water molecules. The shake-up peak at 289.43 eV correspond to the δ-δ* transition in graphite. The ratio of the sp$^2$ and sp$^3$ domains was 4.59 indicating highly pure graphite. After interaction, the sp$^3$ character becomes more pronounced; reflected in the C1s peak which becomes more symmetric with enhanced broadening towards higher binding energy (FIG. 4). It is difficult to uniquely peak fit such mixed sp$^2$/sp$^3$ spectra; however, peaks corresponding to C—NH (amine, ~288 eV), C=O (carbonyl, ~288.1 eV), C—O (~285.5 eV) and C—OH (hydroxyl, ~285.5 eV) groups could be easily detected (spectral parameters shown in Table 3). The sp$^2$/sp$^3$ ratio in collagen-graphene, decreased from 4.59 to 2.08 which proves that collagen dispersed in acetic acid is the most efficient. The broadening determined from FWHM also increased, however the concentration of the peak at ~285.56 eV increased with the appearance of a new peak at ~288 eV.

TABLE 3

Parameters showing binding energy (eV), chemical bonds, full width at half maximum (FWHM, eV), relative % concentration and sp$^2$/sp$^3$ ratio of spectral components of the deconvoluted C1s peaks

| Sample | Binding Energy (eV) | Bond assignment | FWHM (eV) | Relative % conc. | sp$^2$/sp$^3$ |
|---|---|---|---|---|---|
| GR | 284.50 | C—C/C=C | 0.98 | 75.50 | 4.59 |
|  | 285.56 | C—OH | 2.12 | 16.43 |  |
|  | 289.43 | π-π* | 5.01 | 8.02 |  |
| G-AA | 284.43 | C—C/C=C | 1.29 | 67.54 | 2.08 |
|  | 285.61 | C—OH/C—O | 2.22 | 22.86 |  |
|  | 288.03 | C=O/C—NH | 2.12 | 9.60 |  |

Figure 5:
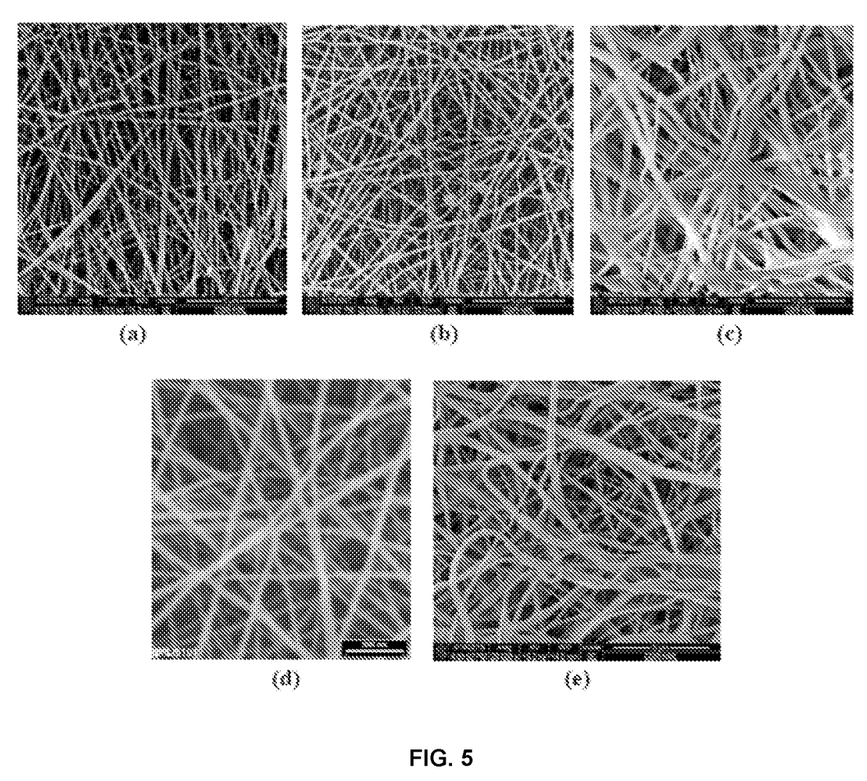

Characterization of Nanofibers using G:C wt:wt ratio of 1:1
Scanning Electron Microscopy FIGS. 5 (a, c, d, e) shows the recorded SEM image for PVA/Graphene spun nanofibers (G:C 1:1), where the PVA is present at concentrations of 7 wt/v %, 8 wt/v %, 8.5 wt/v % and 9 wt/v %, respectively. The diameter of the nanofibers varies in the range of ~150-300 nm. The Solution concentration has a significant effect on the fiber diameter. At lower concentrations of PVA (7 wt/v %), spindle-like beaded fibers are obtained while at higher concentrations of PVA (8 wt/v %, 8.5 wt/v % and 9 wt/v %), smooth fibers are obtained. Thus, the fiber diameter increases with increase in PVA concentration. At higher concentrations of PVA, the charged jet has a greater resistance to the stretching due to the high viscosity of the mixtures. Fibers made using 8 wt/v % PVA-PVA/Graphite nanofiber (FIG. 5b)—show spherical beads and a fiber diameter that is much lower than the same concentration of PVA in the control PVA/Graphene nanofibers. SEM images shows cylindrical morphology with almost no fiber bundles and junctions indicating that the fibers are dry when they reach the collector drum. The smallest average fiber diameter is obtained in the 7 wt/v % PVA composite material (i.e. the 7 wt/v % PVA/Graphene nanofiber), which shows the best result. This is considered the best result because the 7 wt/v % PVA/graphene mixture is homogenous, the 7 wt/v % solution has the lowest viscosity, and as a result the amount of stretching in the presence of an electric field is higher, which leads to thinner fibers. Thinner fibers are more desirable because of low bundling.

Mechanical Testing

Table 4 shows the ultimate tensile strength of samples with different concentrations of PVA. From the SEM images discussed above, an increase in PVA concentration results in an increase in the fiber diameter, which is directly related to the mechanical properties of the nanofibers. In addition, changes in the graphene concentration also affect the Ultimate tensile strength of composite fibers.

TABLE 4

| Sample Number (from Example 1) | PVA concentration | Control PVA Nanofibers Ultimate Tensile strength (MPa) | PVA-GR Nanofibers Ultimate Tensile strength (MPa) |
|---|---|---|---|
| 4 | 7 wt/v % | 4.09 | 4.93 |
| 3 | 8 wt/v % | 4.30 | 5.23 |
| 2 | 8.5 wt/v % | 3.97 | 5.67 |
| 1 | 9 wt/v % | 8.28 | 10.50 |

Figure 6A:
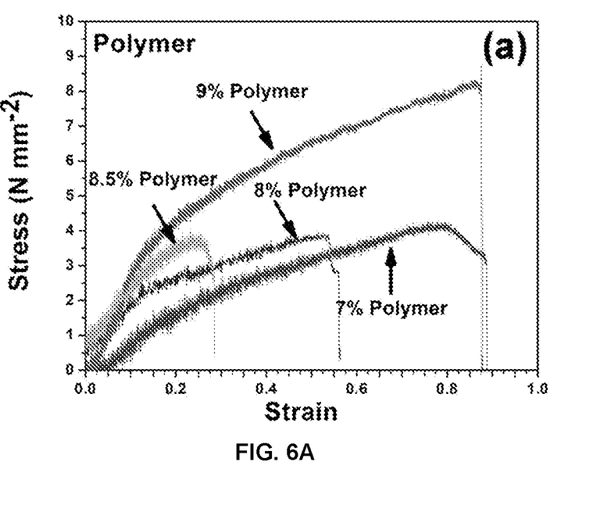
FIG. 6 Effect of fiber diameter on Tensile strength of (a) PVA nanofibers and (b) PVA-graphene:collagen nanofibers FIG. 7 Effect of Graphene concentration on Ultimate Tensile Strength (UTS): (a) 7 wt/v % PVA (highest concentration of graphene); (b) 8 wt/v % PVA; (c) 8.5 wt/v % PVA; (d) 9 wt/v % PVA (lowest concentration of graphene).
Figure 6B:
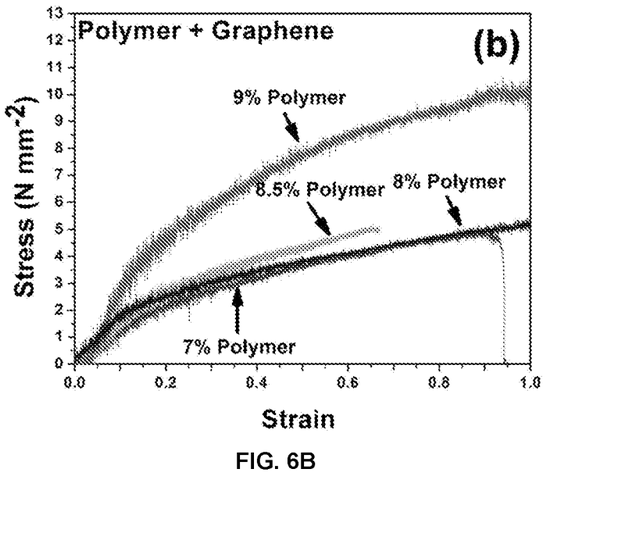
Figure 7:
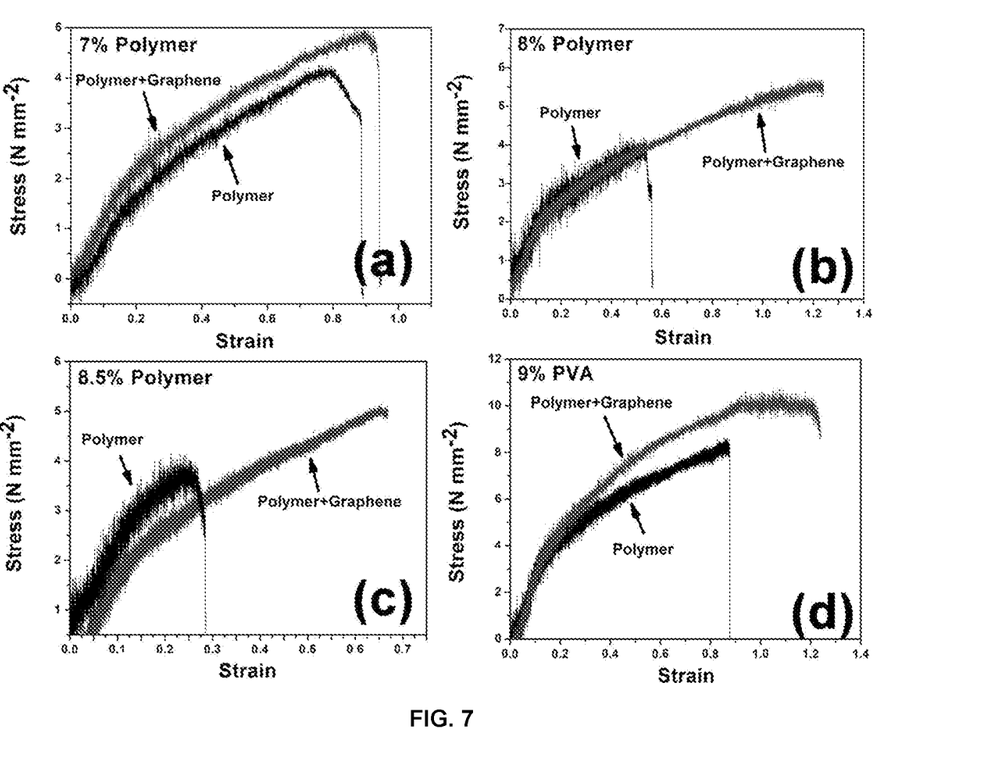
Figure 8:
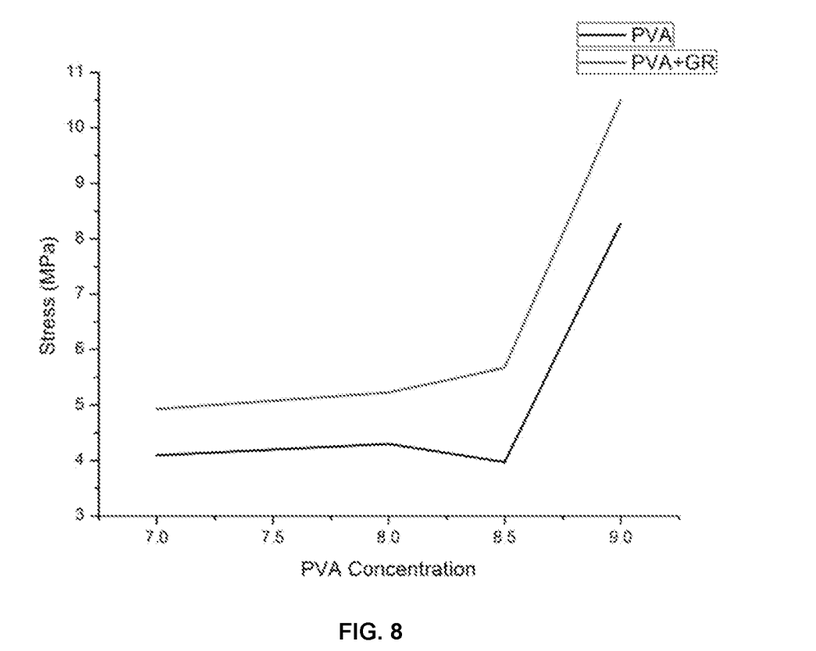
FIG. 8 Ultimate Tensile Strength versus PVA Concentration

FIGS. 6 (a & b) shows the effect of PVA concentration on the ultimate tensile strength of the nanofibers. With an increase in PVA concentration (wt/v %), the fiber diameter also increases and the changes in the fiber diameter can be directly related to the mechanical properties of the nanofibers. Also, changes in the Graphene:collagen composite concentration affects the ultimate tensile strength of the composite fibers. FIGS. 7 (a, b, c, d) shows the variation in ultimate tensile strength with graphene:collage composite addition at different concentrations (a lower concentration of PVA reflecting an increased concentration of graphene:collagen composite). FIG. 8 compares the ultimate tensile strength of PVA/Graphene composite nanofiber with a respective control PVA nanofiber (obtained by diluting the 10 wt/v % PVA stock solution with water), it is clear from FIG. 8 that the ultimate tensile strength increases with addition of the graphene:collagen composite. The highest strength is obtained for 9 wt/v % PVA/graphene:collagen composite, which has an ultimate tensile strength of 10.50 MPa.

Example-2

0.1 g of collagen-graphene composite was mixed homogenously with 8% PVA polymer solution and electrospun to form nanofiber sheet (syringe pump speed at 0.01 mm/min; applied voltage at 20 kV; and traverse speed was 2 cm/min).

CV was conducted using a three electrode system; the fiber was clamped between folded platinum foil which served as the working electrode and dipped in aqueous electrolyte. Scan rate varied from 0.1 mV/sec to 10 mV/sec. The voltage window was kept between 0.5-5V. The value of specific capacitance was 19.5 F/g.

Example-3

0.2 g of collagen-graphene composite was mixed homogenously with 8% PVA polymer solution and electrospun to form nanofiber sheet.

CV was conducted using a three electrode system. The fiber was clamped between folded platinum foil which served as the working electrode and dipped in aqueous electrolyte. Scan rate varied from 0.1 mV/sec to 10 mV/sec. The voltage window was kept between 0.5-5V. The value of specific capacitance was 76.4 F/g.

Example-4

0.4 g of collagen-graphene composite was mixed homogenously with 8% PVA polymer solution and electrospun to form nanofiber sheet. CV was conducted using a three electrode system. The fiber was clamped between folded platinum foil which served as the working electrode and dipped in aqueous electrolyte. Scan rate varied from 0.1 mV/sec to 10 mV/sec. The voltage window was kept between 0.5-5V. The value of specific capacitance was 232.8 F/g.

Example-5

0.6 g of collagen-graphene composite was mixed homogenously with 8% PVA polymer solution and electrospun to form nanofiber sheet. CV was conducted using a three electrode system. The fiber was clamped between folded platinum foil which served as the working electrode and dipped in aqueous electrolyte. Scan rate varied from 0.1 mV/sec to 10 mV/sec. The voltage window was kept between 0.5-5V. The value of specific capacitance was 30.8 F/g.

Figure 9:
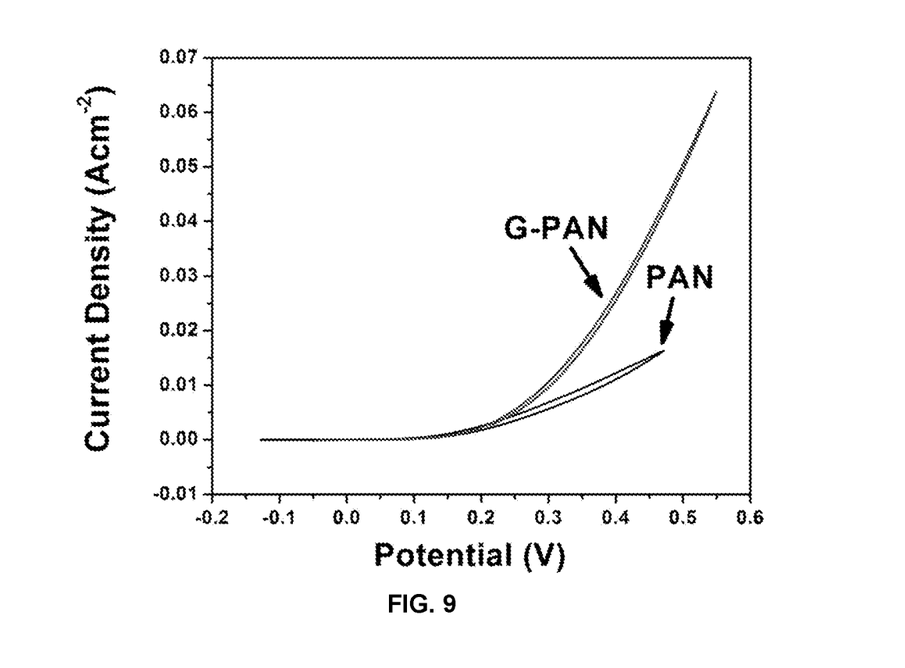
FIG. 9 Cyclic voltametry of PAN polymer and graphene-PAN polymer nanofibers
Figure 10:
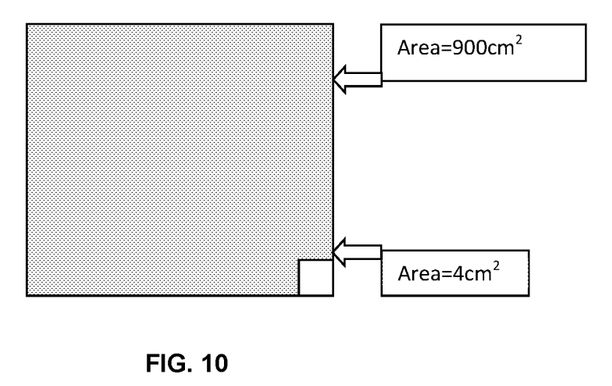
FIG. 10 A schematic representation of the electrospun nanofiber sheet (900 cm$^2$ from 30 ml solution) and a small portion (4 cm$^2$) is cut from it FIG. 11 Cyclic voltametry of PVA polymer and graphene-PVA polymer nanofibers at a scan rate of 10 mV/s

Capacitance Measurements for Nanofibers
Cyclic Voltammetry—Method 1
Graphene-PAN Nanofibres CV of Graphene-PAN nanofibres, made in accordance with the general teaching provided herein, was conducted using a three electrode system; the fibers were used as the active material, calomel as the reference and graphite as the counter/auxiliary electrode. The nanofibers were clamped between folded Pt foil which served as the working electrode and dipped in 1M $NaSO_3$ aqueous electrolyte. Current vs Voltage scans were carried out at a fixed scan rate of 0.5 mV/sec within the range −0.1-0.5 V; area of PAN and G-PAN was 128 $cm^2$ and 384 $cm^2$. The specific capacitance was calculated from the equation. Cyclic voltammetry tests were performed at room temperature using a Gamry Reference 600 potentiostat/galvanostat/ZRA, within the voltage range of −0.1 to 0.5 V. From FIG. 9 we can clearly see that the current density of G-PAN was much higher than that of PAN, the measured capacitance of PAN was 9.92 F/g and G-PAN was 55.28 F/g which is a 5 fold increase. The increase is due to the increased electrical conductivity and porosity of the graphene-collagen composite Graphene-PVA Nanofibres 2% graphene-collagen in a 1:1 ratio by weight was mixed in 30 ml 8% PVA and electrospun into nanofibers. FIG. 10 shows a schematic representation of the electrospun nanofiber sheet (900 $cm^2$ from 30 ml solution) and the small portion (4 $cm^2$) is cut from it and used as an electrode in measurement of electrochemical capacitance. The electrode was directly suspended in the electrolyte with the help of platinum foil. The mass of nanofiber was measured. The organic electrolyte used was dimethyl formamide (DMF) containing 0.1M lithium chloride. Cyclic voltammetry (CV) tests were performed at room temperature using a GAMRY Reference 600 potentiostat/galvanostat/ZRA, in the voltage range of −0.5 to +0.5V.

Figure 11:
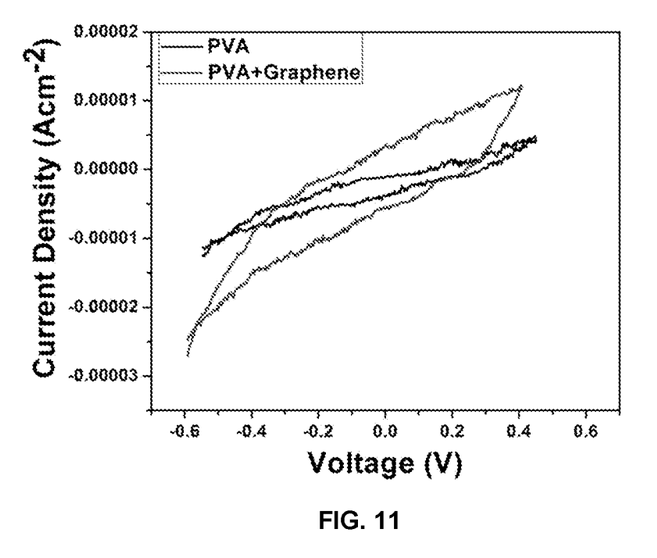

FIG. 11 shows the charge stored curves, and it can be seen that addition of graphene increases the charge storing capacity of the PVA nanofibres, ways of further increasing charge storage include:
 1. Vacuum heat treating the PVA nanofibres; and
 2. Heat treating the PVA nano fibres in a carbon environment,
Both are reported to increase charge storage.
Cyclic Voltammetry—Method 2

Cyclic voltammetry (CV) and galvanostatic charge discharge experiments were performed on electrodes containing the composite polymer materials of Example 1. The electrodes were prepared by coating the composite material on 2 cm×2 cm stainless steel plates that were 5 mm thick. The active material (collagen-graphene composites as electrospun nanofibers) was mixed with carbon black (conducting additive) and PVDF (polyvinylidene fluoride) in NMP (organic solvent), which acts as the binder. The weight:weight ratio of active:carbon black:PVDF was 9:0.5:0.5.

In the current example, 0.9 g of active material, 0.05 g of active carbon, and 0.05 g of PVDF were mixed per 1 mL of NMP used. A few drops of the resulting slurry was dried on the steel plates and used for electrochemical measurements. The test was done in 1M aqueous $Na_2SO_3$ (Sodium Sulfite) solution; the reference electrode was saturated Calomel/Ag/AgCl; the counter electrode was Platinum wire. The potential scanning range for CV shall be: −0.2 to +1.0 volt (with respect to SCE). The scan rate for CV was 5, 10, 20, 50, 100, 200 mV/sec. For galvanostatic charge-discharge curves (potential vs time), the potential range of: −0.2V to +0.4V was used with varying current densities such as: 1, 2, 5, 10, 20 Amps/g.

Electrochemical measurements were carried out using coated steel stubs. The synthesized collagen-graphene composite material (90%) was prepared as an electrode by mixing with 5% conductive Carbon Black, 50% compressed (Alfa Aesar) and 5% poly (vinylidene fluoride) (Aldrich) as binder in 1-methyl-2-pyrrolidinone (Sigma Aldrich) to obtain a slurry and then the slurry coated onto a 304LN stainless steel stub. The mass loading of active material was 0.045 g $cm^{-2}$. The electrolyte used was an aqueous 1 M sodium sulphite. Cyclic voltammetry tests were performed at room temperature using a Gamry Reference 600 potentiostat/galvanostat/ZRA, within the voltage range of −0.2 to 1.0 V. For the cyclic voltammetric measurements, the scan rate ranged from 1, 5, 10, 20, 50 mV $s^{-1}$.

TABLE 5

| Scan Rate (mVs$^{-1}$) | Mass of active material | Calculated Capacitance (machine generated) | Specific Capacitance (F/g) |
| --- | --- | --- | --- |
| 1 | 0.045 g | 15.19 C | 337.5 |
| 5 | 0.045 g | 3.42 C | 76.0 |
| 10 | 0.045 g | 1.87 C | 41.5 |
| 20 | 0.045 g | 0.96 C | 21.3 |
| 50 | 0.045 g | 0.38 C | 8.4 |

The cyclic voltammetry measurements (current vs voltage plot) were used to determine the charge stored in the material being tested. The cyclic voltammetry machine's software calculates the charge stored by dividing the area under the curve scan rate in units of coulombs (Table 5). Therefore, capacitance calculated is inversely proportional to the scan rate.

The stored charge when divided by the weight of the active material and the operating voltage window gives the specific capacitance (F/g). (Cs=Charge stored/mass*voltage=Coulomb/gram*volt=Farad/gm)

The increase of capacitance with decreasing scan rate observed in the results given in Table 5 above was the expected behaviour. This is because the Faradaic current has time to flow when scan rates are slow, which increases the area under the curve and hence the charge stored is also greater.

The specific energy, or energy density (E), is the energy per unit mass, according to the following equation:

$$E = \tfrac{1}{2} \times C_{sp} \times V^2$$

$C_{SP}$=337.5 F/g; $\Delta V$=1 volt;
Thus, E=½×337.5×1² Wsec/g; or $$E = 1/2 \cdot 337.5 \times 1 \times \frac{1000}{3600} \text{ Wh/Kg},$$

thus: E=46.88 Wh·$Kg^{-1}$ for the tested material.

The invention claimed is:

1. A composite material comprising:
   graphene;
   acetylated collagen; and
   a polymeric material providing a polymeric matrix, wherein
   the graphene is attached to the acetylated collagen to form a graphene-collagen composite and the graphene-collagen composite is dispersed within the polymeric matrix,
   wherein:
   the weight:weight ratio of graphene to collagen in the graphene-collagen composite material is from 0.1:1 to 3:1; and
   the weight:weight ratio of the polymeric material to the graphene in the collagen-graphene composite material is from 500:1 to 2250:1.

2. The composite material of claim 1, wherein the weight:weight ratio of graphene to collagen in the graphene-collagen composite material is from 0.5:1 to 2:1.

3. The composite material of claim 1, wherein the polymeric material is selected from one or more of the group consisting of polyvinyl alcohol, polyaniline, polystyrene, polypyrole, polymethylmethacrylate, polyvinylidine fluoride, polyacrylonitrile and polyacetylenes.

4. The composite material of claim 3, wherein the polymeric material is polyvinyl alcohol or polyacrylonitrile.

5. The composite material of claim 1, wherein the composite material is in the form of a fibre or fibres.

6. The composite material of claim 5, wherein the composite material is in the form of a mat formed from the fibre or fibres.

7. The composite material of claim 1, wherein the graphene contains from 1 layer of graphene to 6 layers of graphene.

8. The composite material of claim 7, wherein the graphene contains from 1 layer of graphene to 3 layers of graphene.

9. The composite material of claim 1, wherein the dispersion of the graphene-collagen composite material within the polymeric matrix is homogeneous and/or the composite material has an ultimate tensile strength of from 1.0 MPa to 20 MPa.

10. The composite material of claim 1, wherein the graphene-collagen composite has:
    (a) a zeta potential of from +30.0 to −30.0 mV; and/or
    (b) a hydrodynamic diameter of from 100 nm to 500 nm; and/or
    (c) a polydispersity index of from 0.1 to 0.5 when measured using dynamic light scattering.

11. The composite material of claim 1, wherein the weight:weight ratio of the polymeric material to the graphene in the collagen-graphene composite material is from 1000:1 to 1500:1.

12. The composite material of claim 1, wherein the weight average molecular weight of the polymer is from 16,000 to 120,000 Daltons.

13. The composite material of claim 1, wherein the energy density of the composite material is from 20 to 500 Wh·Kg$^{-1}$.

14. A capacitor comprising a composite material according to claim 1.

15. A process to prepare a composite material according to claim 1, said process comprising:
   (a) mixing a graphene-collagen composite material dispersion in a first solvent with a polymer dissolved in a second solvent to form a composite solution; and
   (b) removing the solvent from the composite solution.

16. The process of claim 15, wherein in step (b) the process of removing the solvent comprises electrospinning the composite solution to form a fibre and/or a fibre mat.

17. The process according to claim 15, wherein the polymer forms from 5 wt/v % to 12 wt/v % of the composite solution.

18. The process of claim 16, wherein, in the electrospinning process:
   (a) the electrospinning voltage is from 10 to 20 kV; and/or
   (b) the distance between the ejector and collector of an electrospinning device used in the process is from 5 to 20 cm; and/or
   (c) the feed rate of the electrospinning process is from 0.01 to 0.05 mm/min.

\* \* \* \* \*